(12) United States Patent
Dutta

(10) Patent No.: US 6,772,208 B1
(45) Date of Patent: Aug. 3, 2004

(54) METHOD AND APPARATUS TO RESTRICT FREE HYPERLINKING BY INTERNET CONTENT DISTRIBUTORS TO WEB SITES OF ORIGINAL CONTENT PRODUCERS

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,855

(22) Filed: Nov. 4, 1999

(51) Int. Cl.⁷ .............................................. G06F 13/00
(52) U.S. Cl. ..................................... 709/225; 709/219
(58) Field of Search ................................. 709/224, 227, 709/228, 219, 225; 707/10, 513.5, 501.1; 705/14; 710/36

(56) References Cited

U.S. PATENT DOCUMENTS

| | | | |
|---|---|---|---|
| 5,509,070 A | | 4/1996 | Schull ............................ 380/4 |
| 5,678,041 A | | 10/1997 | Baker et al. ................ 395/609 |
| 5,717,860 A | * | 2/1998 | Graber et al. ................ 709/227 |
| 5,761,683 A | | 6/1998 | Logan et al. ................ 707/513 |
| 5,781,900 A | | 7/1998 | Shoji et al. ..................... 707/6 |
| 5,784,564 A | | 7/1998 | Camaisa et al. ........ 395/200.54 |
| 5,802,299 A | | 9/1998 | Logan et al. .......... 395/200.48 |
| 5,812,769 A | * | 9/1998 | Graber et al. ................ 709/228 |
| 5,835,718 A | | 11/1998 | Blewett .................. 395/200.48 |
| 5,867,667 A | | 2/1999 | Butman et al. ........ 395/200.79 |
| 5,870,546 A | | 2/1999 | Kirsch .................... 395/200.33 |
| 5,960,409 A | * | 9/1999 | Wexler .......................... 705/14 |
| 6,018,619 A | * | 1/2000 | Allard et al. ................ 709/224 |
| 6,189,030 B1 | * | 2/2001 | Kirsch et al. ............... 709/224 |
| 6,269,370 B1 | * | 7/2001 | Kirsch et al. ................. 707/10 |
| 6,321,242 B1 | * | 11/2001 | Fogg et al. ................. 707/513 |
| 6,457,076 B1 | * | 9/2002 | Cheng et al. ................. 710/36 |
| 6,519,616 B1 | * | 2/2003 | Zamora -McKelvy et al. ........ 707/501.1 |
| 6,578,078 B1 | * | 6/2003 | Smith et al. ................ 709/224 |
| 6,601,066 B1 | * | 7/2003 | Davis-Hall ..................... 707/5 |
| 6,606,653 B1 | * | 8/2003 | Ackermann, Jr. et al. .. 709/219 |

OTHER PUBLICATIONS

"PURL Frequently Asked Questions", Mar. 20, 1996.*
Vianne Sha, "PURLs", Google Search, Jan. 8, 1996.*

* cited by examiner

Primary Examiner—John Follansbee
Assistant Examiner—Jungwon Chang
(74) Attorney, Agent, or Firm—Duke W. Yee; Marilyn Smith Dawkins; Stephen R. Tkacs (57) ABSTRACT

The present invention enables content producers to selectively choose which content distributors may hyperlink to the content producer's website. The content producer provides an initial URL referencing a document on the content producer server to the content distributor. The content distributor creates an HTML file that contains the initial hyperlink URL that was given to the content distributor. The content distributor allows the content producer the privilege of updating the HTML file containing the initial hyperlink URL. The content producer may periodically access the content distributor server to replace the hyperlink with a new URL reference to the document. Because the hyperlink referring to a document is modified at the will of the content producer, the content producer controls the entities that can hyperlink to the document. As a side effect, the content producer may also determine which content distributor referred a client and may also keep records of such referral.

25 Claims, 4 Drawing Sheets

METHOD AND APPARATUS TO RESTRICT FREE HYPERLINKING BY INTERNET CONTENT DISTRIBUTORS TO WEB SITES OF ORIGINAL CONTENT PRODUCERS

BACKGROUND OF THE INVENTION

1. Technical Field

The present invention relates to the control of network information server systems supporting World Wide Web based data pages and, in particular, to a server system and process for a content producer controlled dynamic modification of hyperlinks for purposes of restricting content distributors from unauthorized hyperlinking to the content producer's website.

2. Description of Related Art

"Hyperlinking" in documents allows a user to highlight an object, thereby linking the object to another document. Documents may be coded in a standard Hypertext Markup Language (HTML) format. These documents are typically used in a world-wide computer network called the Internet. A user can utilize a web browser to retrieve an HTML document from a remote server and display it on a computer display. Typically, the display contains text and graphics, although it is also possible to play sound and motion picture. These documents embed hyperlinks to other HTML documents. The user can click on a link in a predetermined location of the document, and an HTML document associated with that link will be retrieved from the same or another server.

Due to the completely distributed client/server architecture of the Web, as made possible by the Uniform Resource Locator ("URL") system further supported by the existing Internet name resolution services and routing conventions, HTTP servers can be independently established with little difficulty. The number of HTTP servers and the number of Web pages in them have been expanding rapidly in recent years. Because of the time, cost, and complexity of assembling comprehensive, yet efficiently searchable databases of web information and resources, commercial Internet Business Services (IBS) have been established to provide search engine services to allow easy access to the numerous HTTP servers and Web pages currently in existence, and also to provide a categorization of the various types of information available on the Web. Examples of an IBS include Yahoo!, Lycos, Excite, etc. While categorizing information available on the Web into distinct topics or groups of topics, IBS Web pages typically contain hyperlinks to the Web servers and pages owned and operated by others. Because the IBS is essentially an aggregator of information produced by independent content producers on the Web, Internet Business Services are referred to as content distributors. Clients on the World Wide Web often access an IBS and follow hyperlinks to other Web sites.

Access to search engines is usually provided through server local web pages served by the IBS and is typically fee based or supported by advertising revenue. The results of a search are served in the form of local web pages with appropriate embedded remote or hyperlinked URLs dynamically constructed by the server of the IBS. The hyperlinked URLs in most cases refer to Web pages of content producers on the topic of the search.

An example of content aggregation is illustrated by the case where the content distributor Yahoo! creates a web page which has hyperlinks to several news articles on a recent earthquake. One of the hyperlinks references an article on the New York Times website. New York Times is primarily a content producer as it generally has articles written by its own reporters. If no control is provided to New York Times over access to its website, then Yahoo! may freely include the hyperlink to the New York Times article on earthquakes. Users of the web are more likely to go to the Yahoo! website to find news articles because a number of articles are conveniently referenced in one location, unlike the New York Times website which may only have one article. Thus, the creator of a website runs the risk that others will create Web pages with hyperlinks to the website regardless of the desires of the website creator. Internet content distributors such as Yahoo!, Lycos, Excite, etc. currently depend on extensive categorization and associated hyperlinking to millions of Web pages located all over the world. Internet content distributors generally do not create any substantial website themselves, but rather glean their business from distributing the content of websites produced by others. Many content producers, like Web newspapers and magazines, are interested in making a profit on the website (s) that they have created. However, this is impossible to do if everyone freely has access to the content producer's website.

One method that has been developed to restrict access to a content producer's website is the use of a user password log-on in order to access the website. Thus, even though content distributors like Yahoo! may have hyperlinks to the website, the client that tries to access the website through the Yahoo! hyperlink must also have a log-on or user password in order to access the website. The problem with this solution is that the content producer's website cannot be accessed seamlessly through the pages that were downloaded from the content distributor's website. Thus, the value of the content producer to the content distributor is diminished. Furthermore, many users of the Internet dislike user password type log-on systems because of the time required and the hassle involved.

Another solution to this problem is a method that relies on creating copies of the original content producer's web pages on the content distributor's website and referencing these copied pages using modified hyperlinks in the content distributor's web pages. Although it is easy to actively modify the hyperlinks while delivering content to the Web client, there are several disadvantages to this method.

The first disadvantage is the problem of keeping the two copies of the same web page in synchronization with each other. In other words, when the content producer changes a page on the website of the content producer, the copy that remains on the content distributor's website is different than the original page. The second disadvantage of this method is that the content producer may not be willing to provide copies of the website to others. Therefore, a content distributor would be unable to get the client access to the content producer's website. The third disadvantage of this method is that it is not practical for content distributors like Yahoo! or Excite that have links to millions of pages on the Internet because the method requires too much space on the content distributor's website. A fourth disadvantage of using this method is that, by providing copies to the content distributor, anyone is allowed to hyperlink to the pages of the copies of the content distributor, and thus the purpose of allowing selective hyperlinking in the first place is defeated.

Therefore, it would be advantageous to have a system which enables content producers to pick and choose which content distributors are allowed to hyperlink to the content producer's website. The system should allow a client to seamlessly access the content producer's website via the content distributor. Furthermore, it should not require that the content distributor make copies of the content producer's web pages on the website. The system should also allow the content producer to determine the content distributor that lead a client to the content producer's site and should provide content producers with an efficient way to negotiate payment or other terms from content distributors before the privilege of hyperlinking is allowed.

In related art, Kirsch (U.S. Pat. No. 5,870,546) discloses a system and method of reliably tracking and redirecting hyperlink references to content producer servers. The invention disclosed by Kirsch allows commercial Internet Business Services (IBS) to decide whether a client should access a content producer server or not. However, the invention does not allow the content producer server to have control over access to the website of the IBS. Hence, the content producer is not in control of restricting hyperlinks to itself under its own schedule and discretion.

SUMMARY OF THE INVENTION

The present invention enables content producers to selectively choose which content distributors may hyperlink to the content producer's website. Once an agreement is provided to allow the content distributor to hyperlink to a content producer's website, the content producer provides an initial URL to the content distributor. The content distributor creates an HTML file that contains the initial hyperlink URL that was given to the content distributor. The content distributor in turn allows the content producer the privilege of updating the HTML file that is made by the content distributor. In a typical scenario, an Internet client establishes a communication link to the website of the content distributor. A user at the Internet client then downloads an HTML file and sees the hyperlink to the initial URL that is provided by the content distributor. After the user at the Internet client clicks on the hyperlink to the initial URL, the content producer delivers the document pointed to by the initial URL to the Internet client. The content producer generates a new hyperlink to the same document that was initially referenced and then modifies the HTML file on the content distributor's website replacing the initial URL with a new URL. In this manner, the content producer may determine which content distributor the client requested through and therefore which content distributor HTML file should be updated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
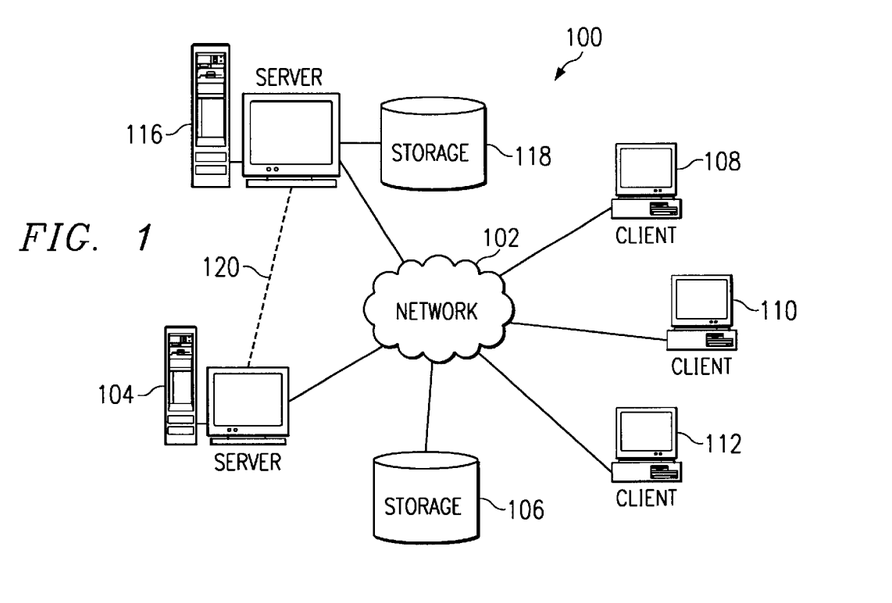
FIG. 1 is a schematic diagram of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 and a server 116 are connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example., distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

In a preferred embodiment of the present invention, a web client 112 accesses the website of a content distributor server 104. The content distributor server 104 provides an HTML file to the web client 112 via the network 102. The HTML file that is received and displayed by the web client 112 contains a hyperlink that references a document contained on a content producer server 116 and stored on disk 118. A user at web client 112 clicks on the hyperlink within the displayed HTML file using a selection device such as a mouse and a request is sent to the content producer server 116 to provide the document referenced by the hyperlink. Once the document is retrieved by the web client 112, the content producer server 116 may then modify the HTML file on the content distributor server 104 containing the hyperlink to the document. This modification may be done via the network 102 or may also be done through a direct link 120 between the content distributor server 104 and the content producer server 116. One of ordinary skill in the art will recognize that there are numerous methods of modifying the hyperlink. However, the reason for modifying the hyperlink is to allow the content producer server 116 to have control over access to its website. By modifying the hyperlink periodically, other servers are prohibited from freely hyperlinking to the referenced document.

Figure 2:
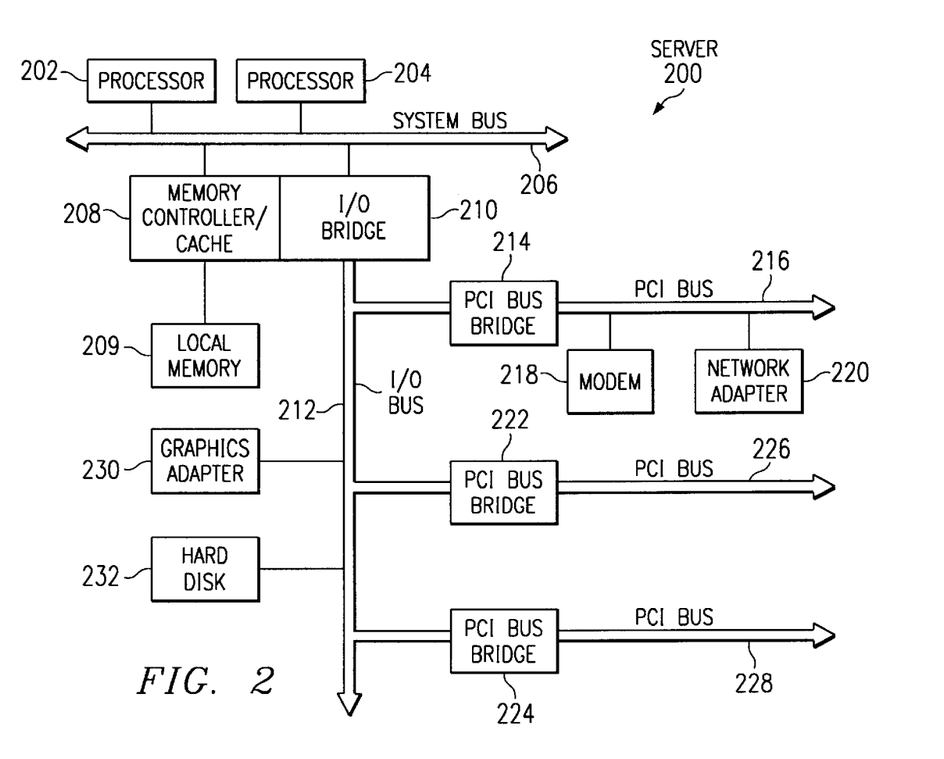
FIG. 2 is a block diagram that depicts a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

Figure 3:
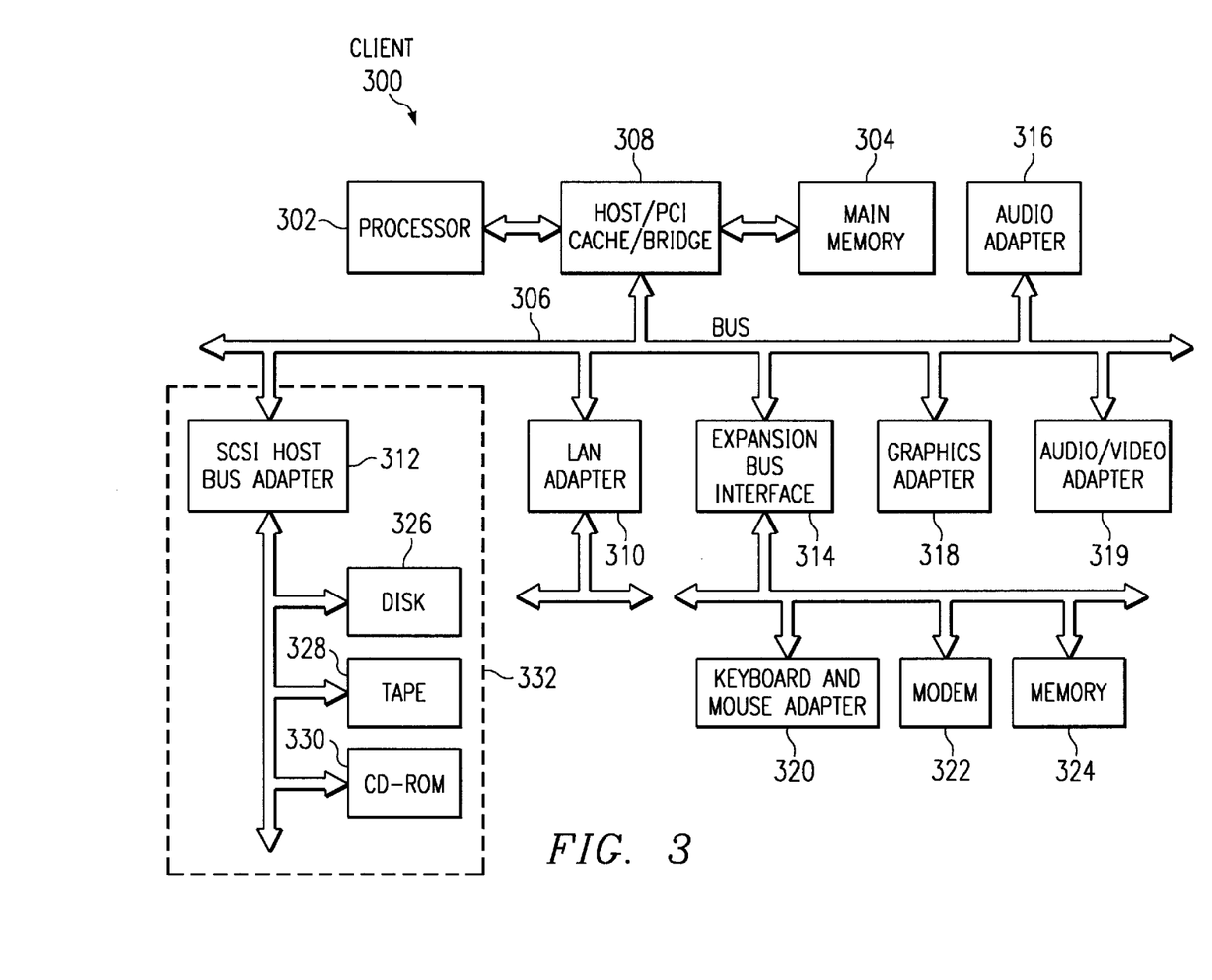
FIG. 3 is a block diagram illustrating a data processing system that may be implemented as client in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture(ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
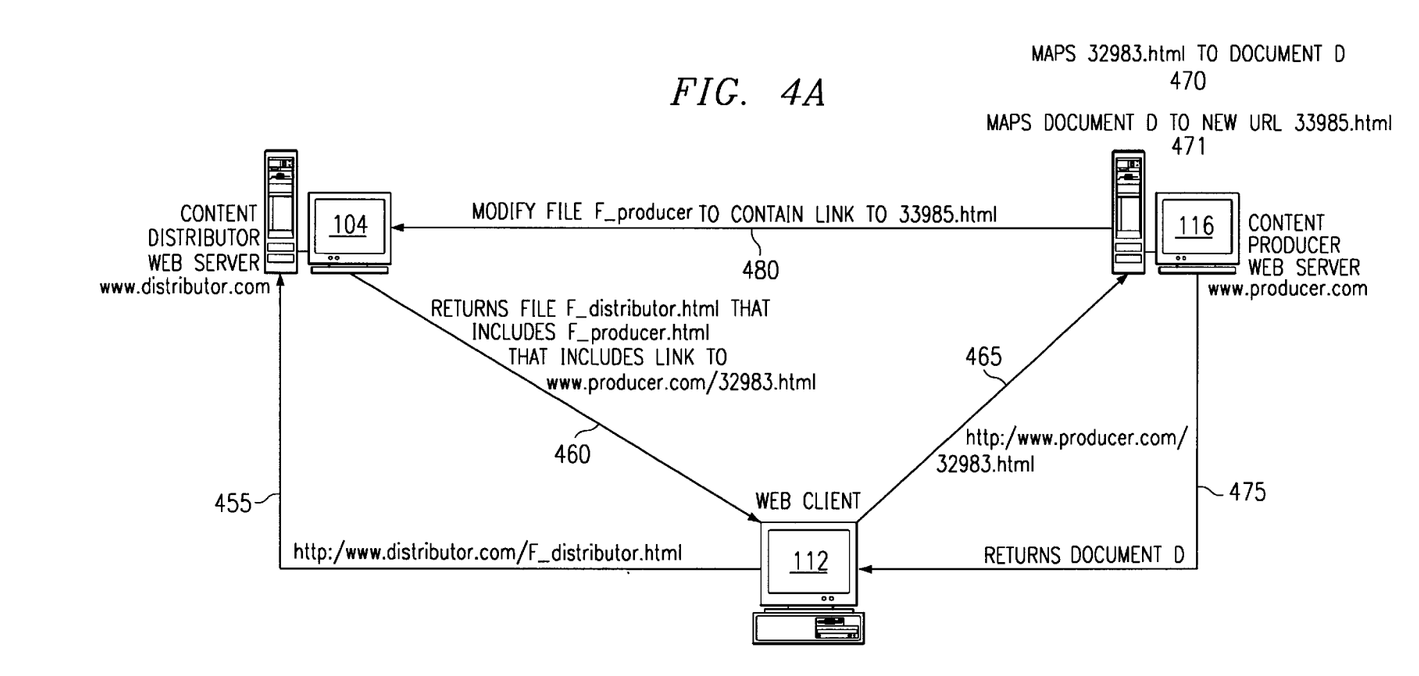
FIG. 4A is a data flow diagram of a preferred embodiment of the present invention is shown.

Referring now to FIG. 4A, a data flow diagram of a preferred embodiment of the present invention is shown. At step 455, web client 112 makes a request to the content distributor server 104 for a web page referenced as http://www.distributor.com/F_distributor.html. At step 460, the content distributor server returns the file "F_distributor.html." This file includes the file "F_producer.html" that includes a link to www.producer.com/32983.html. At step 465, the web client 112 selects the link to send a request to the content producer server for the document D that is referenced by that link. When the content producer server 116 receives the request, it first maps the 32983.html to a document D at step 470. After that, it remaps the document D to a new URL 33985.html at step 471. At the same time, it returns the document D originally requested by the web client 112 at step 475. Upon returning the document D, the content producer server 116 modifies the file F_producer.html at step 480 so that the file contains a link to the new URL www.producer.com/33985.html, for example. Thus, the next time that a web client requests or clicks the link that references document D, the link that is returned by the content distributor server 104 is now www.producer.com/33985.html. If a user or client 112 tries to request the document D using the old URL www.producer.com/32983.html, the hyperlink would no longer be valid and the user would get an error message.

Figure 4B:
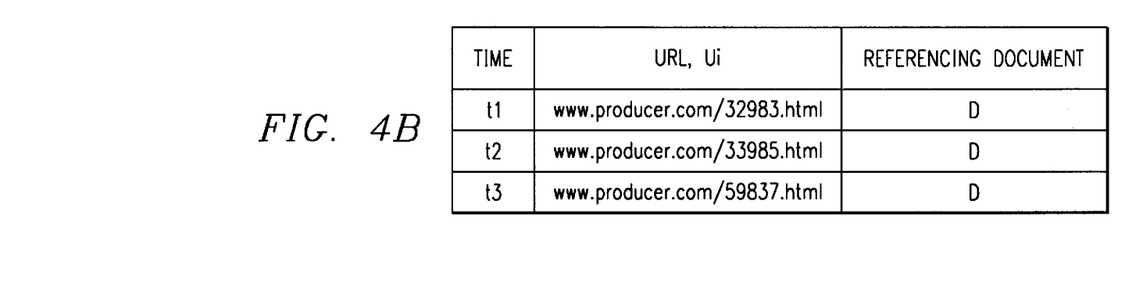
FIG. 4B is a table indicating the manner in which the link to a document D changes with time.

Referring now to FIG. 4B, a table indicating the manner in which the link to a document D changes with time is shown. The URLs shown in FIG. 4B were randomly chosen. One skilled in the art would recognize that any number of URLs could be used to dynamically alter the URL reference to the document D. Note that the initial part of the URL "www.producer.com" stays the same over time. It is only the mapping within the producer server that is changed.

Figure 4C:
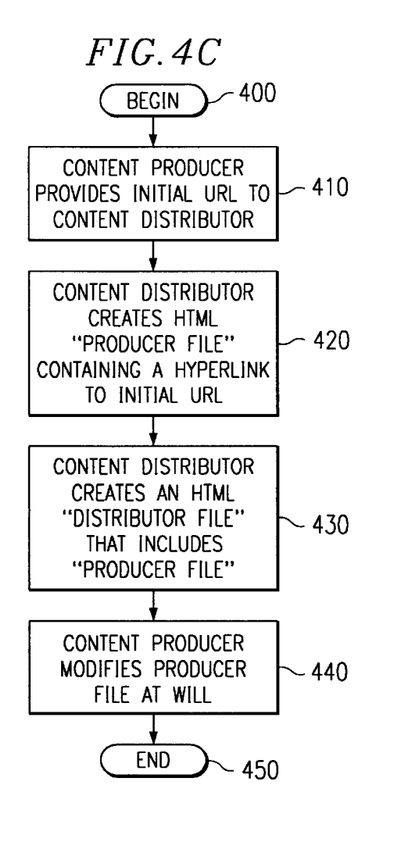
FIG. 4C is a flowchart of the agreement phase of a preferred embodiment.

Referring now to FIG. 4C, a flowchart of the agreement phase of a preferred embodiment is illustrated. Before the web client is provided the HTML file of the content distributor server, here referred to as "distributor file," the content producer server provides an initial URL to the content distributor server (step 410). The initial URL is a valid reference to a document on the content producer server. The content distributor then creates an HTML file (step 420). This file is referred to as "producer file" and contains a hyperlink pointing to the initial URL provided by the content producer. The content distributor also creates an HTML "distributor file" that includes the producer file (step 430). One of ordinary skill in the art will recognize that the distributor file may be generated dynamically after the client makes a search request, for example. The producer file may be embedded in the distributor file using the "object" tag contained in HTML 4.0. The content producer is allowed to modify the producer file which is stored on the content distributor server, but only the content distributor may modify the distributor file. This prevents the content producer from modifying the distributor file without the permission of the content distributor. The file arrangement described here is for illustrative purposes only and is not intended to be a limit on the file architecture of the present invention.

Figure 5:
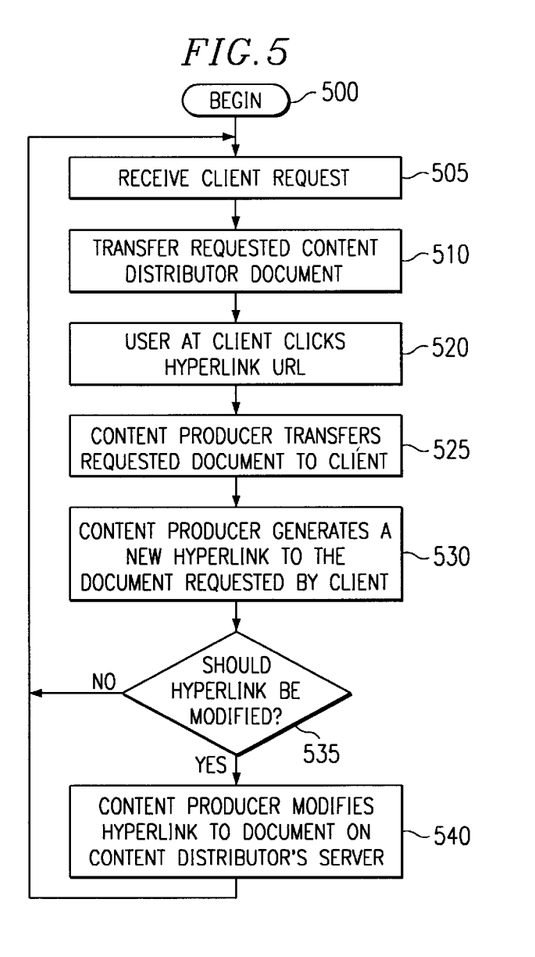
FIG. 5 is a flowchart of a preferred embodiment of the dynamic stage of the present invention.

Referring now to FIG. 5, a flowchart of a preferred embodiment of the dynamic stage of the present invention is illustrated. The process begins with the client logging onto the network and accessing the content distributor website (step 500). The client makes a request to the content distributor server (step 505). The content distributor server then transfers the requested content distributor document containing a hyperlink URL to the content producer document (step 510). The user at the client clicks on the hyperlink URL using a selection device such as a mouse (step 520). Upon clicking the desired hyperlink, the content producer transfers the requested document to the client (step 525). The content producer then generates a new hyperlink to the document that was requested by the client (step 530). Once a new hyperlink is generated by the content producer, the content producer modifies the hyperlink to the document on the content distributor server (step 540). The content producer may modify the hyperlink at any desirable time increments. For example, the content producer may modify the hyperlink after each access to the document or it may modify the hyperlink after a set number of accesses to the document to the content distributor server.

Figure 6:
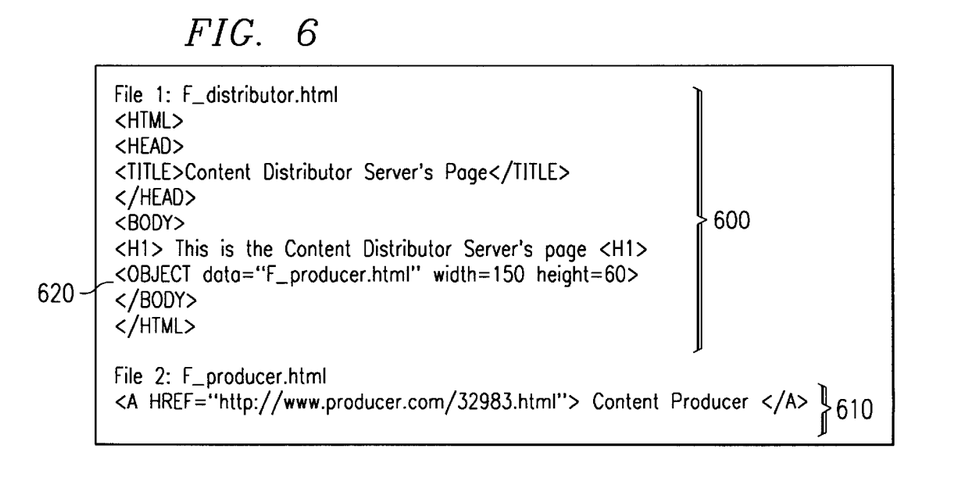
FIG. 6 is an example of a distributor file and a producer file for HTML version 4.0.

Referring now to FIG. 6, an example of a distributor file 600 and a producer file 610 is shown for HTML version 4.0. Note that the object tag 620 is used in the distributor file to embed the producer file 610. The distributor file 600 may be created dynamically when a client makes a request. The producer file 610 is created prior to the distributor file 600 but is also stored on the content distributor server. It may be modified at will by the content producer server.

As an illustration of how the invention works, consider a content distributor server with an Internet address of "www.distributor.com," and a content producer server with an Internet address of "www.producer.com." The user of a client accesses the content distributor server by inputting "www.distributor.com" into a web browser. After running a search request or upon selecting a hyperlink on the website, the content distributor server then conveys a distributor file 600 named "F_distributor.html," for example. Before conveying this file, a producer file 610 named "F_producer.html," for example, is created by the content distributor server from an initial URL, for example, "www.producer.com/32983.html" that is provided by the content producer server. The file "F_producer.html" is embedded into the "F_distributor.html" file. The object tag 620 is used in the distributor file to embed the producer file 610. The file may be embedded dynamically after the client makes a search request of the content distributor server. The file "F_producer.html" includes a link to a document D with a web address of "www.producer.com/32983.html." The "F_distributor.html" file is displayed on the client's display and the user at the client may select the hyperlink to the document that is referenced as "www.producer.com/32983.html." When the user selects this hyperlink, the content producer server maps "32983.html" to a document D and returns the document to the client. At the same time, the content producer server maps the document D to a new URL, for example, "www.producer.com/33985.html." The content producer uses HTTP PUT to modify the file "F_producer.html" on the content distributor server so that it contains a hyperlink to "www.producer.com/33985.html" instead of the link to "www.producer.com/32983.html." Thus, the link to the document is dynamically altered whenever a client accesses the document D. In the case that multiple content distributors are given permission by the content producer to access the document D, a plurality of URLs can be mapped to the same document D. For example, "www.producer.com/yahoo32983.html" could be the URL used by Yahoo and "www.producer.com/lycos32983.html" could be the URL used by Lycos to map to the same document D. In this way, the content producer server may determine which content distributor server to update and can make a record of which content distributor server directed a web client to its site. Various accounting functions can be performed by the content producer server using this information.

A modification to the URL may be done after every request or at any time or request interval decided by the content producer. In the preferred embodiment, the HTTP PUT command is used to modify the HTML file on the content distributor server, but this method is not essential to the present invention. The file may be changed in any manner agreed to by the content distributor and the content producer. The method of the current invention may also be included in future versions of HTTP and HTML in order to provide the functionality that is provided in the current disclosure.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the depicted examples are illustrated using HTML and URLs, other markup languages and uniform resource identifiers may be used. For example, extensible markup language (XML) could be used for embodying the processes of the present invention. The embodiment was chosen and described in order to best explain the principles and practical application of the invention and to enable others of ordinary skill in the art to understand the invention for various embodiments with various modifications as are suited to the particular use contemplated.

What is claimed is:

1. A method for controlling access to a content producer server comprising the following steps:
   providing an initial uniform resource identifier, independent of an actual location of a file at the content producer server, to a content distributor server;
   mapping the file, at the content producer server, to the initial uniform resource identifier at the content producer, wherein the mapping is used by the content producer server to service a request for the file from a client producer server using the provided initial uniform resource identifier from the content distributor;
   responsive to a given event other than a change in location of the file at the content producer server, modifying the initial uniform resource identifier, independent of the actual location of the file at the content producer server, on the content distributor server to from a modified uniform resource identifier; and
   remapping the file, at the content producer server, to the modified uniform resource identifier, wherein the remapping is used by the content producer server to service a subsequent request for the file from a client using the modified uniform resource identifier from the content distributor server.

2. The method of claim 1 further comprising the steps:
   providing a first document including the initial uniform resource identifier from the content distributor server to the client;
   responsive to selection of a hyperlink to the initial uniform resource identifier, generating the request at the client; and
   responsive to the request being received at the content producer server, transferring the file on the content producer server to the client.

3. The method of claim 1 wherein the given event is one of a predetermined number of access requests and a predetermined time interval.

4. The method of claim 1 wherein the initial uniform resource identifier is stored in a first markup language file on the content distributor server.

5. The method of claim 4 wherein the first markup language file is embedded in a second markup language file wherein the second markup language file is transferred to a client by the content distributor server.

6. The method of claim 5 further comprising the steps:
   displaying the second markup language file to the user of the client to allow the user to select a hyperlink to the initial uniform resource identifier stored in the first markup language file; and
   transferring the file on the content producer server to the client when the user selects the hyperlink.

7. The method of claim 4 wherein the first markup language file is a hypertext markup language file.

8. The method of claim 1 wherein the file on the content producer server is mapped to a plurality of uniform resource identifiers corresponding to a plurality of content distributors.

9. The method of claim 8 further comprising the step determining a one of the plurality of content distributors that directed the client to the file on the content producer server based on a one of the plurality of uniform resource identifiers used by the client to request the file on the content producer server.

10. The method of claim 9 further comprising the step keeping a record of requests for the file on the content producer server.

11. The method of claim 10 wherein the record is used to determine a number of clients directed to the file on the content producer server by a one of the plurality of content distributors.

12. The method of claim 9 wherein the content distributor server is a server of the one of the plurality of content distributors that directed the client to the file on the content producer server.

13. A system for controlling access to a content producer server comprising;
   a means for providing an initial uniform resource identifier, independent of an actual location of a file at the content producer server, to a content distributor server;
   means for mapping the file, at the content producer server, to the initial uniform resource identifier content producer, wherein the initial uniform resource identifier is used by the content producer server to service a request for the file from a client using the provided initial uniform resource identifier from the content distributor;
   means, responsive to a given event other than a change in location of the file at the content producer server, for modifying the initial uniform resource identifier, independent of the actual location of the file at the content producer server, on the content distributor server to form a modified uniform resource identifier; and
   remapping the file, at the content producer server, to the modified uniform resource identifier, wherein the remapping is used by the content producer server to service a subsequent request for the file from a client using the modified uniform resource identifier from the content distributor server.

14. The system of claim 13 further comprising a first markup language file on the content distributor server for storing the initial uniform resource identifier.

15. The system of claim 14 wherein the first markup language file is embedded in a second markup language file wherein the second markup language file is transferred to a client by the content distributor server.

16. The system of claim 15 further comprising:

a means for displaying the second markup language file to the client to allow a user of the client to select a hyperlink to the initial uniform resource identifier stored in the first markup language file; and a means for transferring the file on the content producer server to the client when the user of the client selects the hyperlink.

17. The system of claim 13 wherein the given event is one of a predetermined number of access requests and a predetermined time interval.

18. The system of claim 14 wherein the first markup language file is a hypertext markup language file.

19. The system of claim 18 wherein the system uses the hypertext transfer protocol.

20. The system of claim 13 wherein the file on the content producer server is mapped to a plurality of uniform resource identifiers corresponding to a plurality of content distributors.

21. The system of claim 20 further comprising a means for determining a one of the plurality of content distributors that directed the client to the file on the content producer server based on a one of the plurality of uniform resource identifiers used by the client to request the file on the content producer server.

22. A program product for controlling access to a content producer server comprising:

a storage medium;

first instructions for providing an initial uniform resource identifier, independent of an actual location of a file at the content producer server, to a content distributor server;

second instructions for mapping the file, at the content producer server, to the initial uniform resource identifier, wherein the uniform mapping is used by the content producer server to service a request for the file from a client actual content using the provided initial uniform resource identifier from the content distributor; and third instructions, responsive to a given event other than a change in location of the file at the content producer server, for modifying the initial uniform resource identifier, independent of the actual location of the file at the content producer server, on the content distributor server to form a modified uniform resource identifier; and remapping the file, at the content producer server, to the modified uniform resource identifier, wherein the remapping is used by the content producer server to service a subsequent request for the file from a client using the modified uniform resource identifier from the content distributor server, wherein the first instructions, the second instructions, and the third instructions are stored on the storage medium.

23. The program product of claim 22 wherein the given event is one of a predetermined number of access requests and a predetermined time interval.

24. The program product of claim 22 wherein the file on the content producer server is mapped to a plurality of uniform resource identifiers corresponding to a plurality of content distributors.

25. The program product of claim 24 further comprising a third instructions for determining a one of the plurality of content distributors that directed the client to the file on the content producer server based on a one of the plurality of uniform resource identifiers used by the client to request the file on the content producer server.

* * * * *

UNITED STATES PATENT AND TRADEMARK OFFICE
CERTIFICATE OF CORRECTION

PATENT NO. : 6,772,208 B1
DATED : August 3, 2004
INVENTOR(S) : Dutta

It is certified that error appears in the above-identified patent and that said Letters Patent is hereby corrected as shown below:

Column 9,
Lines 39-40, after "identifier" delete "at the content producer".
Line 42, after "client" delete "producer server".
Line 48, after "server to" delete "from" and insert -- form --.

Column 10,
Lines 45-46, after "identifier" delete "content producer".

Column 12,
Line 1, after "wherein the" delete "uniform".
Line 3, after "client" delete "actual content".

Signed and Sealed this

Twenty-fifth Day of October, 2005

JON W. DUDAS
*Director of the United States Patent and Trademark Office*